(12) United States Patent
Wang et al.

(10) Patent No.: US 10,901,700 B2
(45) Date of Patent: Jan. 26, 2021

(54) AUTOMATIC GENERATION OF CONTAINER IMAGE IN A RUNTIME ENVIRONMENT

(71) Applicant: INTERNATIONAL BUSINESS MACHINES CORPORATION, Armonk, NY (US)

(72) Inventors: Peng PP Wang, Beijing (CN); Hong Wei Sun, Beijing (CN); Tao Tong, Beijing (CN); Da MD Ma, Beijing (CN); Guang Han Sui, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 15 days.

(21) Appl. No.: 16/287,652

(22) Filed: Feb. 27, 2019

(65) Prior Publication Data
US 2020/0272427 A1    Aug. 27, 2020

(51) Int. Cl.
| | | |
|---|---|---|
| G06F 9/44 | (2018.01) | |
| G06F 8/30 | (2018.01) | |
| G06F 8/65 | (2018.01) | |
| G06F 8/35 | (2018.01) | |
| G06F 9/455 | (2018.01) | |

(52) U.S. Cl.
CPC ............. G06F 8/311 (2013.01); G06F 8/35 (2013.01); G06F 8/65 (2013.01); G06F 9/45558 (2013.01); *G06F 2009/45562* (2013.01)

(58) Field of Classification Search
CPC ........ G06F 8/311; G06F 9/45558; G06F 8/65; G06F 2009/45562; G05F 8/35

USPC ................................................. 717/114–116
See application file for complete search history.

(56) References Cited

U.S. PATENT DOCUMENTS

| | | | | |
|---|---|---|---|---|
| 5,873,097 | A * | 2/1999 | Harris | G06F 16/2308 |
| 7,721,283 | B2 * | 5/2010 | Kovachka-Dimitrova | G06F 8/65 717/102 |
| 8,205,194 | B2 * | 6/2012 | Fries | G06F 9/45558 717/168 |
| 8,261,209 | B2 * | 9/2012 | Goto | G06F 16/51 715/838 |
| 8,281,307 | B2 * | 10/2012 | Arnold | G06F 8/36 718/1 |
| 8,381,231 | B2 * | 2/2013 | Kacin | G06F 21/53 719/317 |

(Continued)

FOREIGN PATENT DOCUMENTS

WO    2017092672 A1    11/2016

OTHER PUBLICATIONS

Syed et al, "The Secure Software Container Pattern", ACM, pp. 1-7 (Year: 2017).*

(Continued)

*Primary Examiner* — Anil Khatri
(74) *Attorney, Agent, or Firm* — Griffiths & Seaton PLLC

(57) ABSTRACT

Various embodiments are provided for automatically generating a container image by a processor. Service runtime information associated with an operating system (OS) may be detect and collected. The collected service runtime information may be validated. A container having the collected service runtime information may be created. A container image may be generated according to the container. The container image may be updated upon detecting a change to the service runtime information.

14 Claims, 9 Drawing Sheets

(56) References Cited

U.S. PATENT DOCUMENTS

| | | | |
|---|---|---|---|
| 9,063,746 B2* | 6/2015 | Yousouf | G06F 8/60 |
| 9,256,424 B1* | 2/2016 | Kuchibhotla | G06F 8/71 |
| 9,367,305 B1 | 6/2016 | Kumar et al. | |
| 9,582,268 B2* | 2/2017 | Kumar | G06F 8/20 |
| 9,916,233 B1* | 3/2018 | Qureshi | G06F 9/45533 |
| 9,983,891 B1* | 5/2018 | Christensen | G06F 8/63 |
| 10,142,109 B2* | 11/2018 | Edwards | G06F 11/079 |
| 10,268,565 B2* | 4/2019 | Agarwal | G06F 11/3612 |
| 10,268,837 B2* | 4/2019 | Agarwal | G06F 21/6245 |
| 10,291,706 B1* | 5/2019 | Zhao | H04L 67/1097 |
| 10,303,388 B1* | 5/2019 | Lieberman | G06F 3/061 |
| 10,379,841 B2* | 8/2019 | Wong | G06F 8/658 |
| 10,409,713 B2* | 9/2019 | Benes | G06F 9/45558 |
| 10,521,242 B2* | 12/2019 | Kirkpatrick | G06F 8/65 |
| 2017/0177877 A1 | 6/2017 | Suarez et al. | |
| 2017/0264684 A1 | 9/2017 | Spillane et al. | |
| 2018/0196654 A1 | 3/2018 | Bo et al. | |
| 2019/0205408 A1* | 7/2019 | Chen | G06F 11/0709 |
| 2020/0065409 A1* | 2/2020 | Batts | G06F 16/2282 |

OTHER PUBLICATIONS

Xu et al, "Mining Container Image Repositories for Software Configuration and Beyond". ACM, pp. 49-52 (Year: 2018).*

Lv et al, "PCCTE: A Portable Component Conformance Test Environment Based on Container Cloud for Avionics Software Development", IEEE, pp. 664-668 (Year: 2016).*

Gholami et al, "Framework for Satisfying the Performance Requirements of Containerized Software Systems Through Multi-Versioning", ACM, pp. 150-160 (Year: 2020).*

Kaniovskyi et al, "Containerized analytics framework for data and compute-intensive pipeline applications", ACM, pp. 1-10 (Year: 2017).*

Hicks et al, "Dynamic Software Updating", ACM, pp. 1049-1096 (Year: 2005).*

Ghosh et al, "Container Orchestration for Dispersed Computing", ACM, pp. 19-24 (Year: 2019).*

Sofat et al, "Modular Web Service Design for Agility and Maintainability with Unity Container", IEEE, pp. 259-263 (Year: 2017).*

Xiao et al, "Towards Dynamic Component Updating: A Flexible and Lightweight Approach", IEEE, pp. 468-473 (Year: 2009).*

"Building Docker Images From a Container" By Developer.com Staff, Jul. 10, 2015 ( 9 Pages ).

* cited by examiner

AUTOMATIC GENERATION OF CONTAINER IMAGE IN A RUNTIME ENVIRONMENT

BACKGROUND OF THE INVENTION

Field of the Invention

The present invention relates in general to computing systems, and more particularly to, various embodiments for automatically generating/building a container image using a computing processor.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these electronic appliances. The amount of information to be processed nowadays increases greatly. Therefore, processing, storing, and retrieving very large amounts of information is a key problem to solve.

SUMMARY OF THE INVENTION

Various embodiments for automatically generating a container image in a computing environment by a processor are provided. In one embodiment, by way of example only, a method for automatically generating a container image by a processor is provided. Service runtime information associated with an operating system (OS) may be detected and collected. The collected service runtime information may be validated. A container having the collected service runtime information may be created. A container image may be automatically generated according to the container. The container image may be updated upon detecting a change to the service runtime information.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
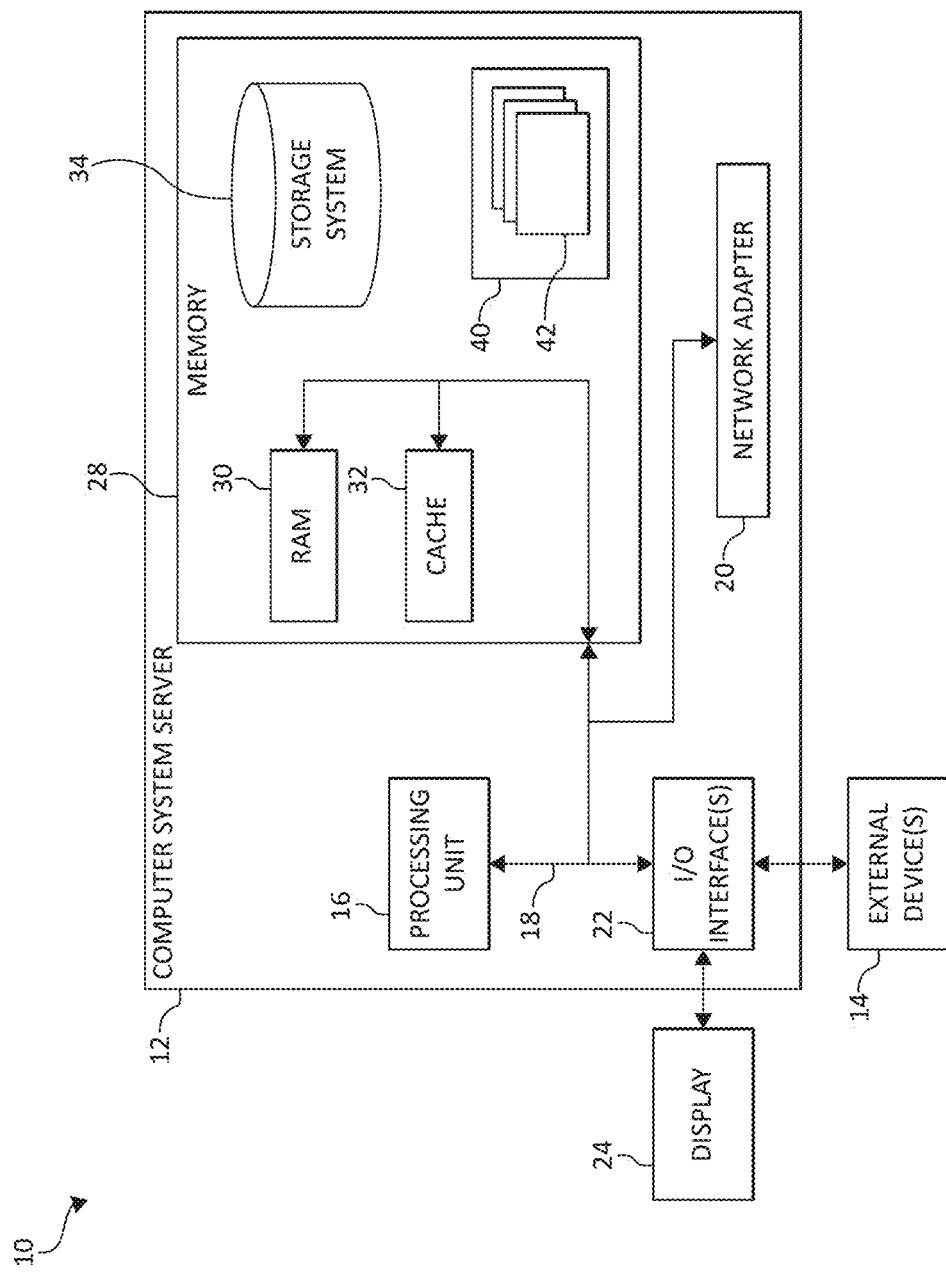
FIG. 1 is a block diagram depicting an exemplary cloud computing node according to an embodiment of the present invention.

Within a computing system architecture, a container such as, for example, a docker container is an open platform for developing, shipping, and running applications. That is, the container (e.g., a docker container) may be an application development platform that may package one or more applications in "containers" enabling the containers to be portable among systems running an operating system (OS). Also, a container may be a form of virtualization and may virtualize the OS thus splitting the OS up into virtualized compartments to run container applications. Simply stated, the container, similar to a virtual machine ("VM") provides an isolated environment for running applications. Thus, at its core, the container provides a way to run almost any application that is securely isolated within the container. A container may consist of an application, user-added files, and metadata for an application.

Each container is built from an image (e.g., container image or "docker image"), which may specify what the container holds, what process to run when the container is launched, and a variety of other configuration data. The container image (e.g., a docker image) is an executable package that includes everything needed to run an application such as, for example, the software/application code, a runtime, libraries, environment variables, and configuration files. The container image may be a read-only template from which the container is launched. The container image may consist of a series of layers. When a container image needs to be changed (for example, an application needs to be updated to a new version), a new layer may be built. Rather than replacing or entirely rebuilding the whole image as may be done with a virtual machine, only that layer needs to be added or updated.

In one aspect, a container image may start from a base image. Further, container images generated for one container can be used as the basis for new container images for another container. For example, if a base image has been generated, the base image can be used as the base image for all web applications. An image can be built from these base images using a set of instructions, each of which creates a new layer in the image.

However, a current challenge is presented if an application developer wants to move an application from a host to container, which requires the application developer to setup all the application dependent environment and container knowledge (e.g., docker container knowledge). In one aspect, the application developer may develop a container file, which can create a container image. The container image includes everything needed to run an application and application developer builds the container based on the container image. However, such an approach has the following disadvantages. First, the application developer is required to know the application running dependent environment such as, for example, the OS, compiler, libraries, etc. Second, the application developer needs to learn how to develop the container file.

In an additional aspect, an identifier of an application that is to be executed may be included in a received execution command. A VM mirror, corresponding to the application to be executed, may be acquired. Since the layer data corresponding to the container and metadata information about the virtual machine mirror can be read from all the layer data in the VM mirror and the layer data corresponding to the container is layer data required for operating the container corresponding to the application to be executed, the container corresponding to the application to be executed is operated according to the layer data corresponding to the container and the metadata information about the virtual machine mirror which are read out. That is, the metadata information of the virtual machine image and the layer data corresponding to the container (e.g., a docker container) may be read from all the layer data in the virtual machine image, and the layer data corresponding to the container is the layer data required for operating the container corresponding to the to-be-executed application. The container corresponding to the to-be-executed application may operate according to the read metadata information of the virtual machine image and the read layer data corresponding to the container. However, such an approach has the following disadvantages. First, this solution only works for moving an application from a virtual machine to a container and cannot move an application from a host to container. Second, this solution requires coping the entire layer data to the container. Thus, in contrast to a requirement of having a specific VM which has a VM image, the present invention may be enabled for both a physical machine and a virtual machine.

Thus, the present invention provides a solution that enables an application developer to move the application from a host to a container without requiring the application developer to setup all of the application dependent environment and having to know the container knowledge, or how to develop a container file. In one aspect, using a specified command or the running process information such as, for example, process identifiers ("ID"), a command name), corresponding runtime environment information may be monitored and collected (e.g., an OS, binaries, libraries, environment variables, related files, related processes). That is, for the specified command, in order to move an application to container, a running process about the application is first required and then a corresponding runtime environment ("env") information may be collected. If there is no running process, a command may be specified (e.g., "specified command") about that application and the present invention may execute the specified command as a running process. Thus, the specified command or the "running process" is specifically about that application. A list dynamic dependencies "ldd" command may be used to collect which libraries are necessary for the application. The runtime "env" command may be used to collect the application running environment variables. A "netstat" command may be used to collect which port are used for that application, then other process that are connected to that port, etc. may be used. A runtime environment may be built on a container. A container image may be generated/built based on the container.

In an additional aspect, the present invention provides for automatically generating a container image to enable moving an application from a host (physical and/or virtual) to a container (e.g., docker container). Service runtime information associated with an OS may be detect and collected. The collected service runtime information may be validated. A container having the collected service runtime information may be created. A container image may be generated according to the container. The container image may be updated upon detecting a change to the service runtime information. Thus, the present invention enables a user (e.g., an application developer) to automatically build a container image an expected runtime environment, without requiring the user to know specific runtime environment details or learn how to build the container file or container image.

In another aspect, the present invention enables building a complex service into a container image, prepares all service related environment by editing a container file, and enables migration of an existing service from a host to a container image when lacking knowledge for the migration operation. In one aspect, the present invention may monitor/detect a service runtime environment and migrate the service runtime environment into the container image (e.g., docker image). With service information or "running process information" (e.g., a process ID, command name), the corresponding runtime environment information (e.g., dependent libraries, environment variables, related files, etc.) may be detected and collected. It should be noted that service information and "running process information" may be the same but the service information is a longer running process and may be started when the operating system ("OS") starts and ends when the OS shutdown.

The collected runtime information can be verified. The same runtime environment may be created on a container, and this container will be saved as a container image (e.g., a docker image), which is the required/needed image (e.g., output or final output of the present invention). The container image can be updated if the service runtime environment is later changed.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
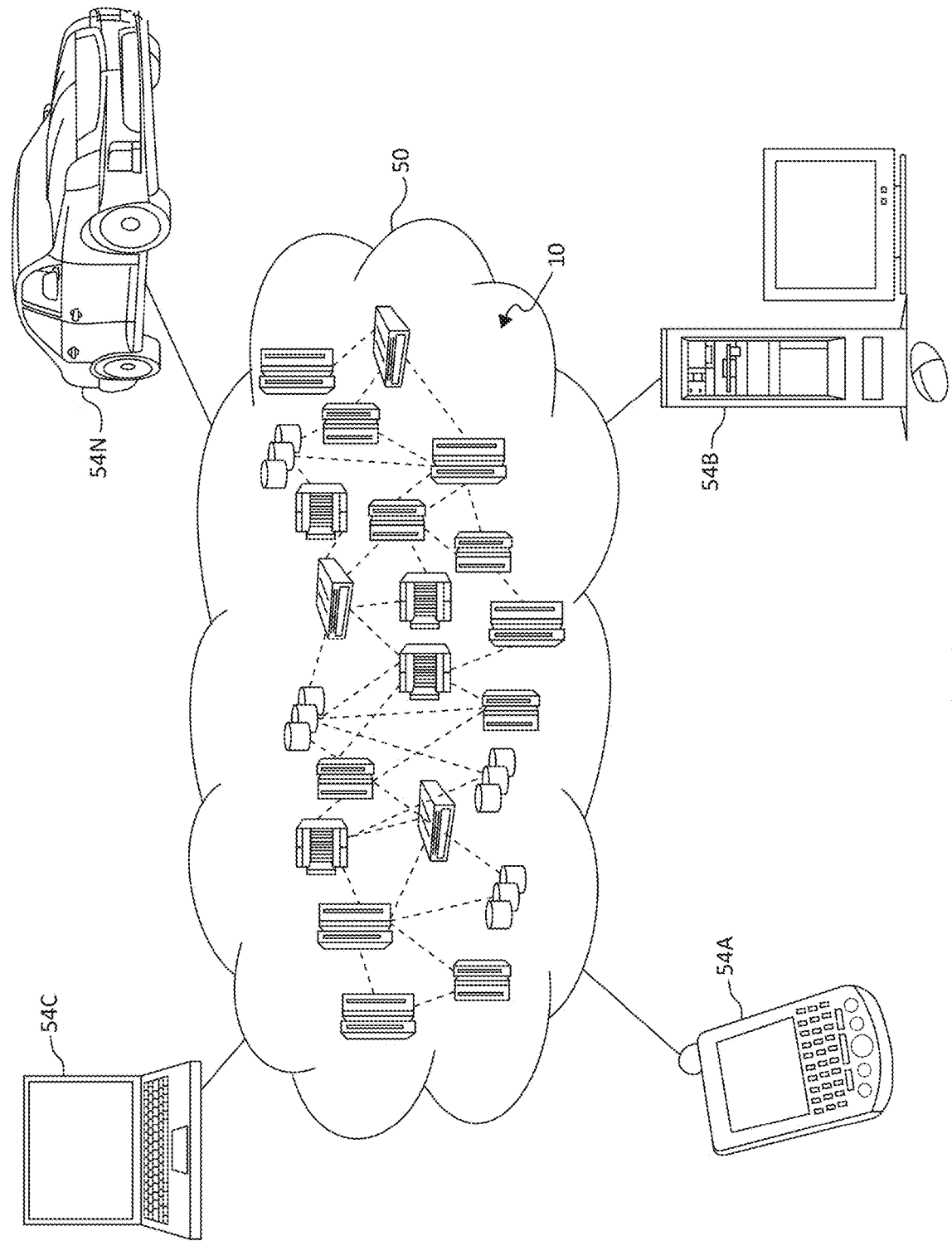
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
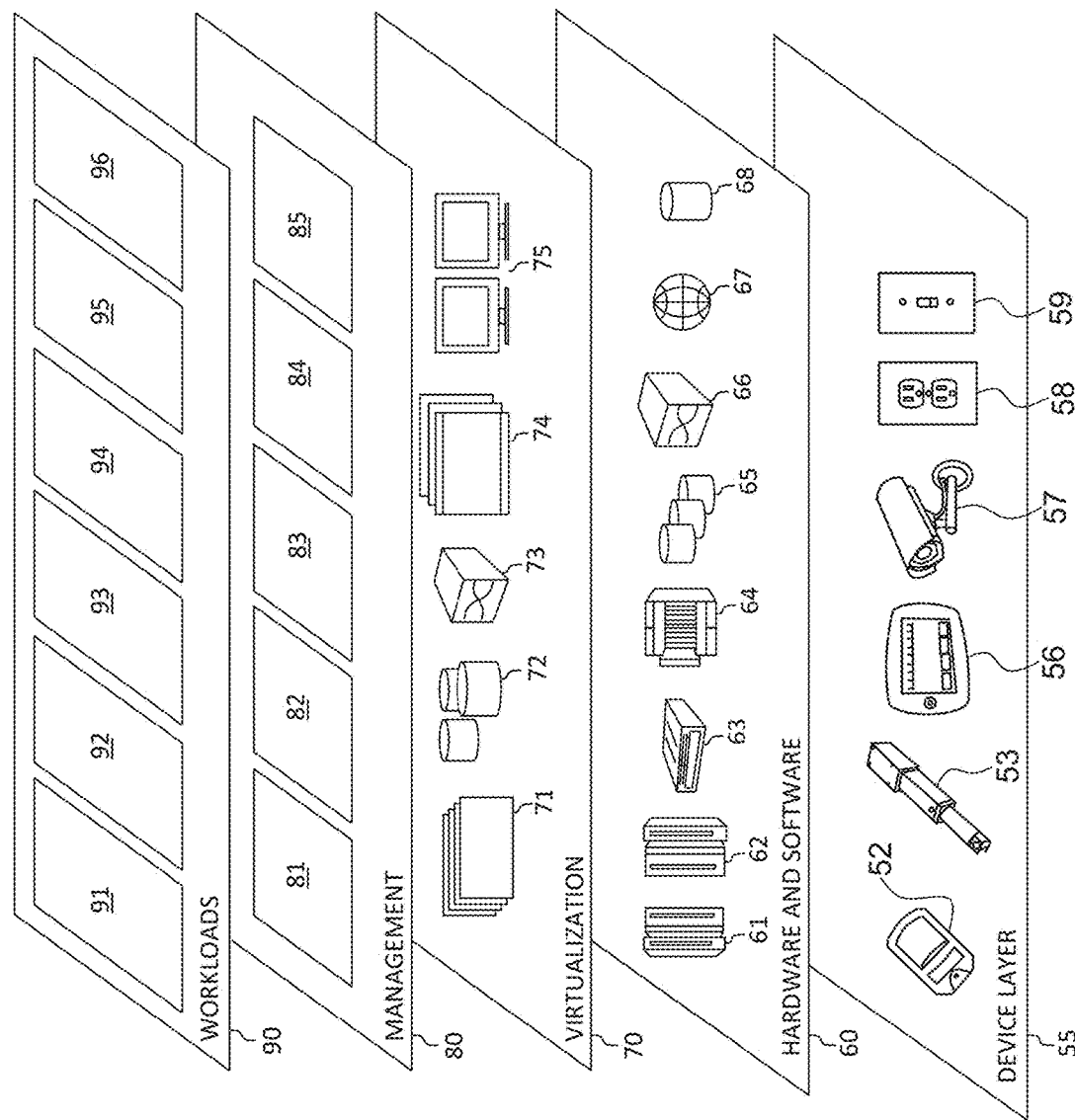
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and, in the context of the illustrated embodiments of the present invention, various workloads and functions 96 for automatically generating/building a container image. In addition, workloads and functions 96 for automatically generating/building a container image may include such operations as data analysis (including data collection and processing from various environmental sensors), data monitoring, data collecting, and/or analytics operations. One of ordinary skill in the art will appreciate that the workloads and functions 96 for automatically generating/building a container image may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
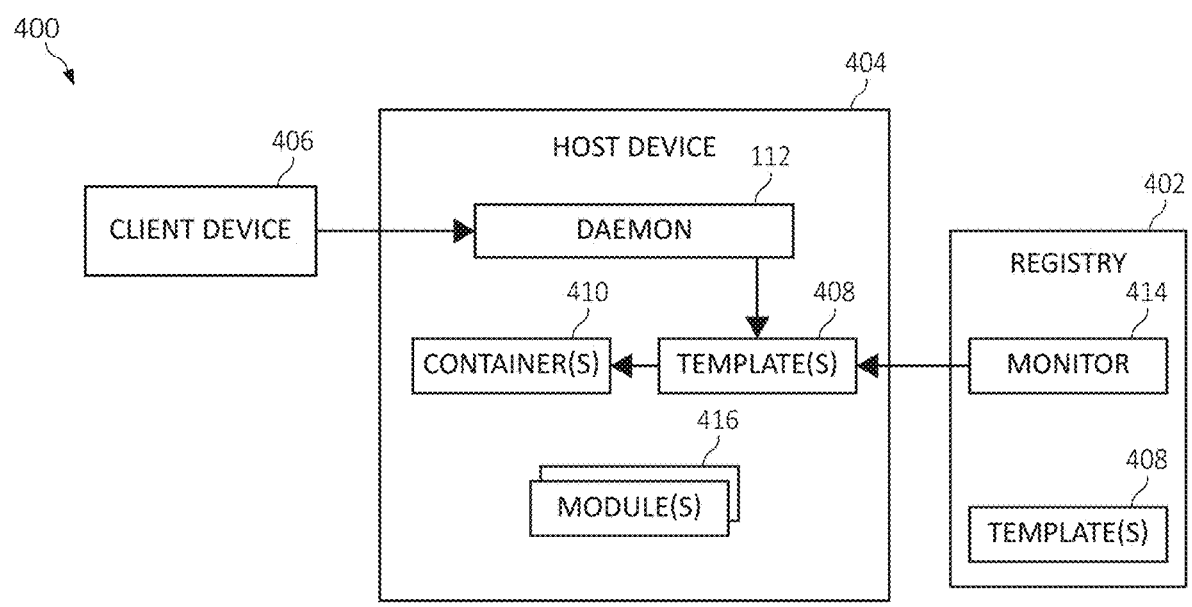
FIG. 4 is an additional block diagram depicting high level block diagram of one embodiment of an enhanced application development system.

Turning now to FIG. 4, is a high-level block diagram of one embodiment of an enhanced application development system 400. In particular, system 400 is an enhanced container platform in this example. The container platform is a platform for developing, shipping, and running applications, as understood by one of skill in the art. It is to be understood, however, that other cloud-based development platforms can be used in other embodiments.

System 400 may include a registry 402, a host device 404, and a client device 406. The registry 402 is configured to store templates 408 which are also referred to herein with respect to the illustrative container platform as container images. The terms image and template can be used interchangeably herein. The registry 402 can include both public templates, which can be shared with any user, and private templates, which are only available to authorized users. As understood by one of skill in the art, container images are used to build applications or other templates. For example, a container image can include an operating system and a web application template.

The host device 404 is configured to retrieve templates 408 from the registry 402 and produce respective containers 410 based on the templates 408 and input from a user via the client device 406 which provides a user interface. In particular, the host device 404 includes a daemon 412 configured to enable interaction between the client device 406 and the host device 404 for configuring and running containers 410. Container daemons are known to one of skill in the art and not described in more detail herein. Additionally, as understood by one of skill in the art, containers hold the needed code and information for an application to run. Each container 410 is an isolated and secure application platform.

Figure 5:
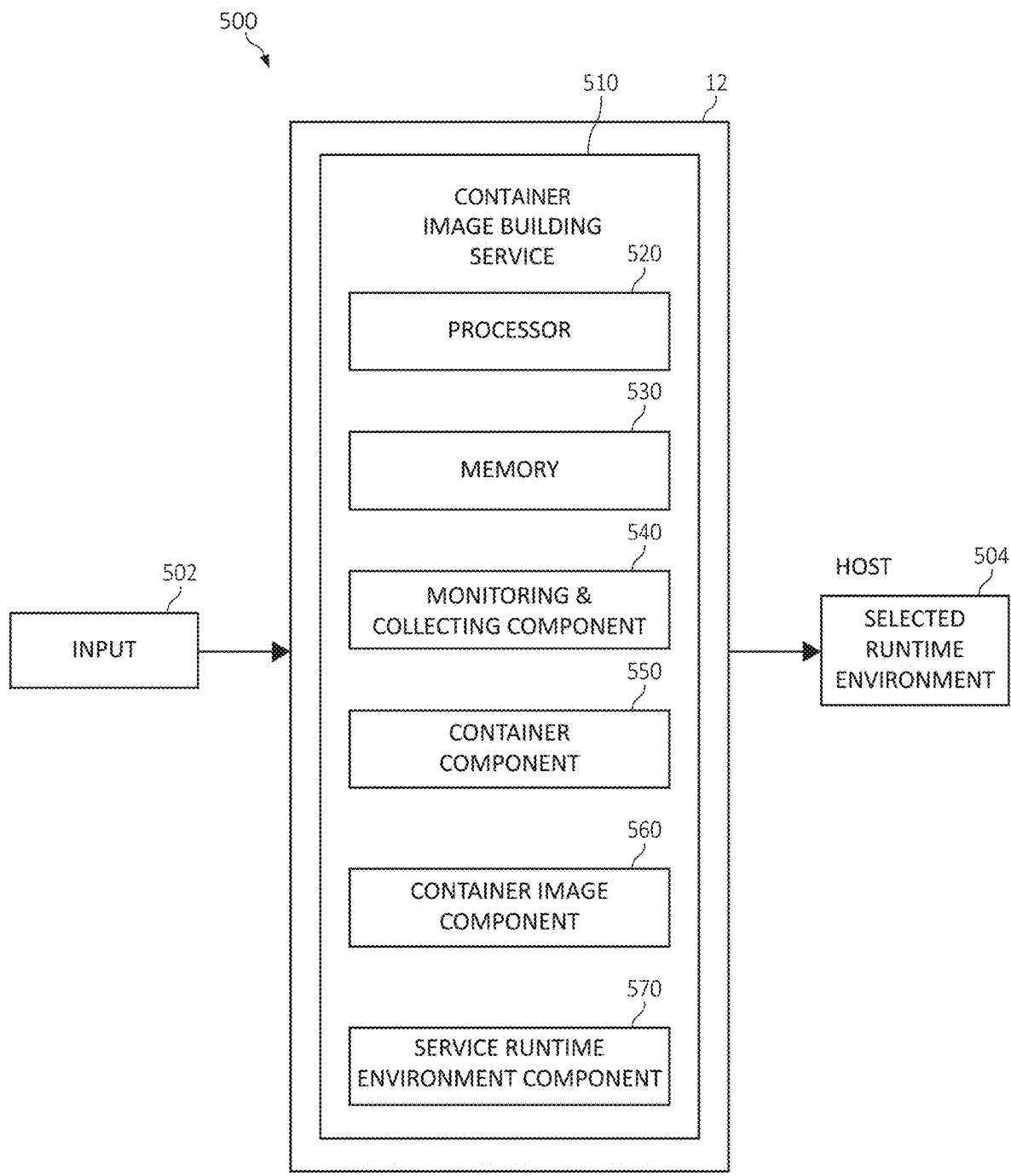
FIG. 5 is an additional block diagram depicting various user hardware and computing components functioning in accordance with aspects of the present invention

Turning now to FIG. 5, block diagram 500 depicts various user hardware and cloud computing components functioning using a centralized event driven index and search infrastructure called "metaocean" having a migration data placement tool is depicted. As shown, the various functionality, or "modules" of functionality, hardware devices, and/or other components in the same descriptive sense as has been previously described in FIGS. 1-4 may be included in FIG. 5.

A container image building service 510 (e.g., container image creations/generation service) is shown, incorporating processing unit 520 ("processor") to perform various computational, data processing and other functionality in accordance with various aspects of the present invention. The container image building service 510 may be included in computer system/server 12, as described in FIG. 1. The processing unit 520 may be in communication with memory 530. The container image building service 510 may include the monitoring and collecting component 540, the container component 550, the container image component 560, and the service runtime environment component 570.

As one of ordinary skill in the art will appreciate, the depiction of the various functional units in container image building service 510 is for purposes of illustration, as the functional units may be located within the container image building service 510 or elsewhere within and/or between distributed computing components.

Responsive to receiving input 502 such as, for example, a specified command that is started on demand when an OS is started and using running process information (e.g., a process ID, command name), the monitoring and collecting component 540 may monitor and collect corresponding runtime environment information such as, for example, an OS, binaries, libraries, environment variables, related files, related processes. That is, the monitoring and collecting component 540 may detect and collect service runtime information associated with an OS. More specifically, the monitoring and collecting component 540, pursuant to collecting the service runtime information, may collect information of the OS, patches information, one or more variables (e.g., environmental variables) and parameters, one or more files, a binary location, one or more libraries, a user identifier (ID), a group ID, a startup time, process ID, a command name, or a combination thereof. The monitoring and collecting component 540 may identify one or more processes of the OS and each process relationship (e.g., communicated with TCP/IP, parent/child, processes, under the same folder, etc.) between the one or more processes, and select the one or more processes of the OS to monitor and collect for the service runtime information. For example, processes may use TCP/IP connection to connect other process. The present invention may detect which port is used by a process and then identify which process is connected to the selected process. If there is a connection, the process is necessary for running application and the process information may be collected. It may be known that the running process is related with the application, so the child process of the running process must be related with the application. Thus, the child process information may also be collected. Also, the same folder's running process information may also be collected since the same folder's file may belong to the same application.

The collected service runtime information may be validated, by the container component 550. The container component 550 may create a container having the collected service runtime information. The container component 550 may create the container with a selected base container image and building a runtime environment based on the collected service runtime information.

The container image component 560 may build/generate a container image according to the container. The container image component 560 may update the container image upon detecting a change to the service runtime information. The created container may be activated using the container image for one of a plurality of selected runtime environment 504.

Figure 6A:
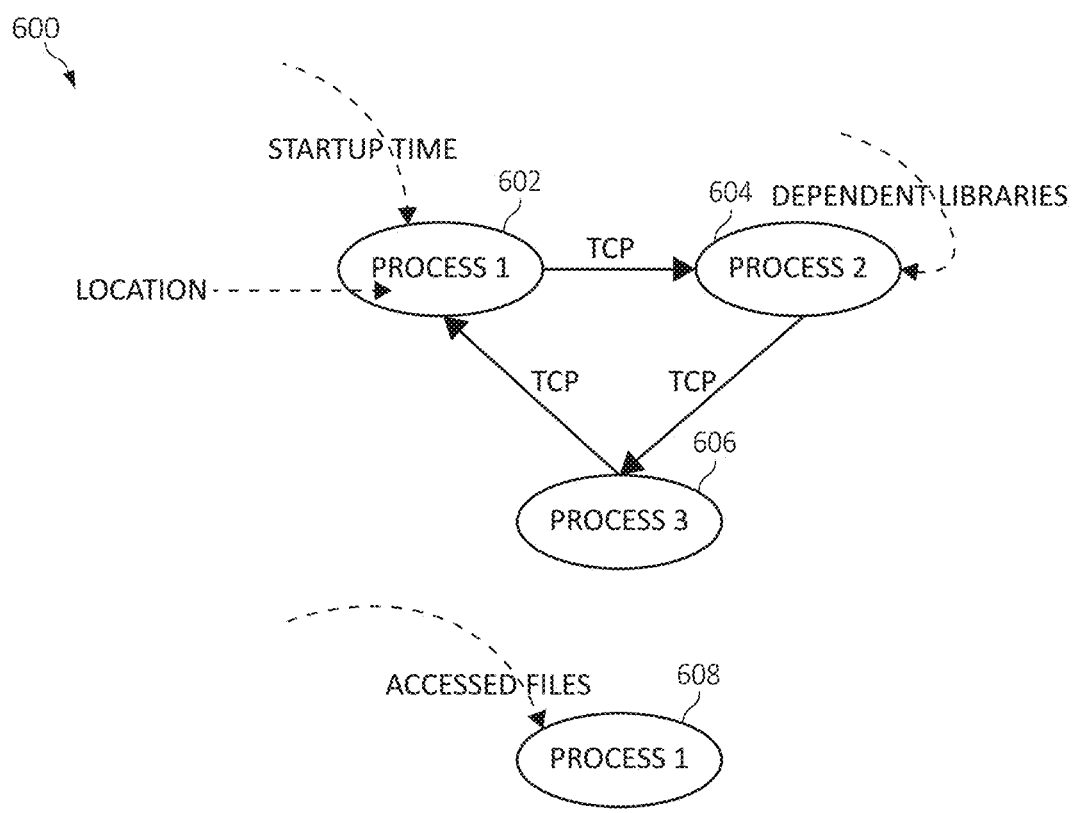
FIGS. 6A-6C are diagrams depicting various operations for automatically generating a container image in accordance with aspects of the present invention.
Figure 6B:
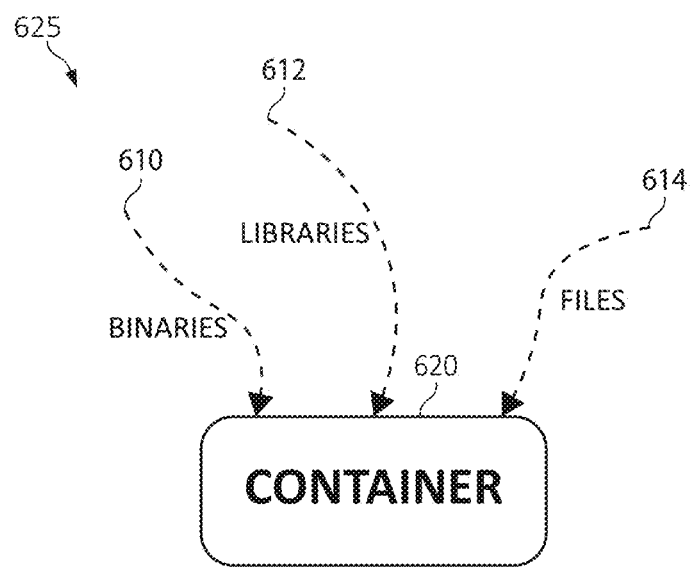
Figure 6C:
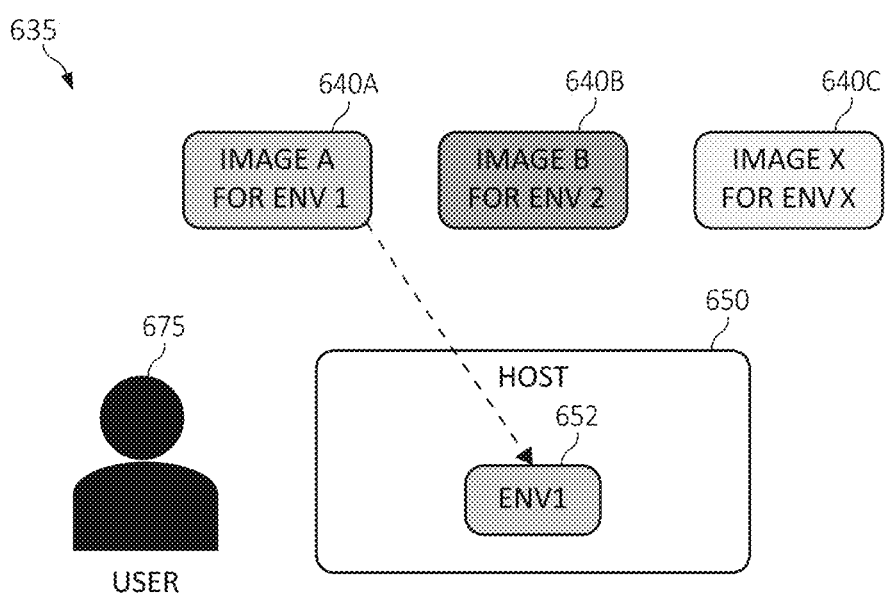

In view of the foregoing, consider the following operations illustrated in FIGS. 6A-6C of the implementation of the aforementioned functionality. Operations of FIGS. 6A-6C may be incorporated into various hardware and software components of a system in accordance with the present invention, such as those described in FIGS. 1-5.

That is, diagrams 600, 625, and 635 of FIGS. 6A-6C, depict various operations for automatically generating a container image. The various operations and functionality of diagrams 600, 625, and 635 may also include various blocks of functionality as depicted with arrows designating relationships with each other and to show process flow.

Starting in FIG. 6A, runtime information may be collected at startup time of an OS that executes process 1, process 2, and process 3, at blocks 602, 604, and 606 respectively. The collected information may include the startup time and location information associated process 1 at block 602, one or more dependent libraries associated with process 2 at block 604, and the transmission control protocol ("TCP") process relationship between process 1 at block 602 and process 2 at block 604. Additionally, each TCP process relationship between process 1 at block 602 and process 3 at block 606 and each TCP process relationship between process 1 at block 602 and process 2 at block 604 may be collected. That is, process 3 at block 608 is a child process of both process 1 at block 602 and process 2 at block 604. Also, any accessed files associated with process 1 at block 602 may also be collect.

Upon collecting the runtime information, a command or running process (e.g., process 1 at block 602, process 2 at block 604, and/or process 3 at block 606) related environment may be verified. The command or running process may be originally provided. With user's request (e.g., request of an application developer), any unrelated running environment information may be cleaned (e.g., rename unrelated files, block a network connection from unrelated binaries/ports/hosts, unset the unrelated environment variables, etc.) on a host, and then user can run a regression test to ensure it is the needed environment.

Turning now to FIG. 6B, a new container 620 with an appropriate base image based on the OS information may be created. The runtime environment may be built based on the previous collected information (as illustrated in FIG. 6A). The operation for building the runtime environment may include, but not limited to, copying one or more related binaries 610, libraries 612, and/or one or more files 614 to the container 620. A script may be built to start a specified command or start a running process with collected environment variables and startup parameters. A script may be built to start the related running processes with corresponding environments variables and startup parameters in sequence during container 620 startup.

Turning now to FIG. 6C, having built the new container 620, the container 620 may be saved as a container image such as, for example, container image A 640A for environment 1 ("env 1"), container image B 640B for environment 2 ("env 2"), and/or container image X 640C for environment X ("env X"). Using the container images such as, for example, container image A 640A, container image B 640B, and/or container image X 640C, the container (e.g., docker container) may be started/commenced for one of a plurality of types of runtime environments. For example, the container image A 640A may be started from for environment 1 ("env1") on host 650.

The container image such as, for example, container image A 640A, container image B 640B, and/or container image X 640C may be updated once the environment is updated. A user can copy the image to the environment that it is from such as, for example, container image A 640A may be copying to environment 1 ("env1") on host 650. If there is a change to the container image (e.g., one or more related services are started, configuration files are changed, etc.), the changes may be detected, and the portion of the container image may be updated, which may be automatically triggered or manually trigged according to an issued command by a user.

Figure 7:
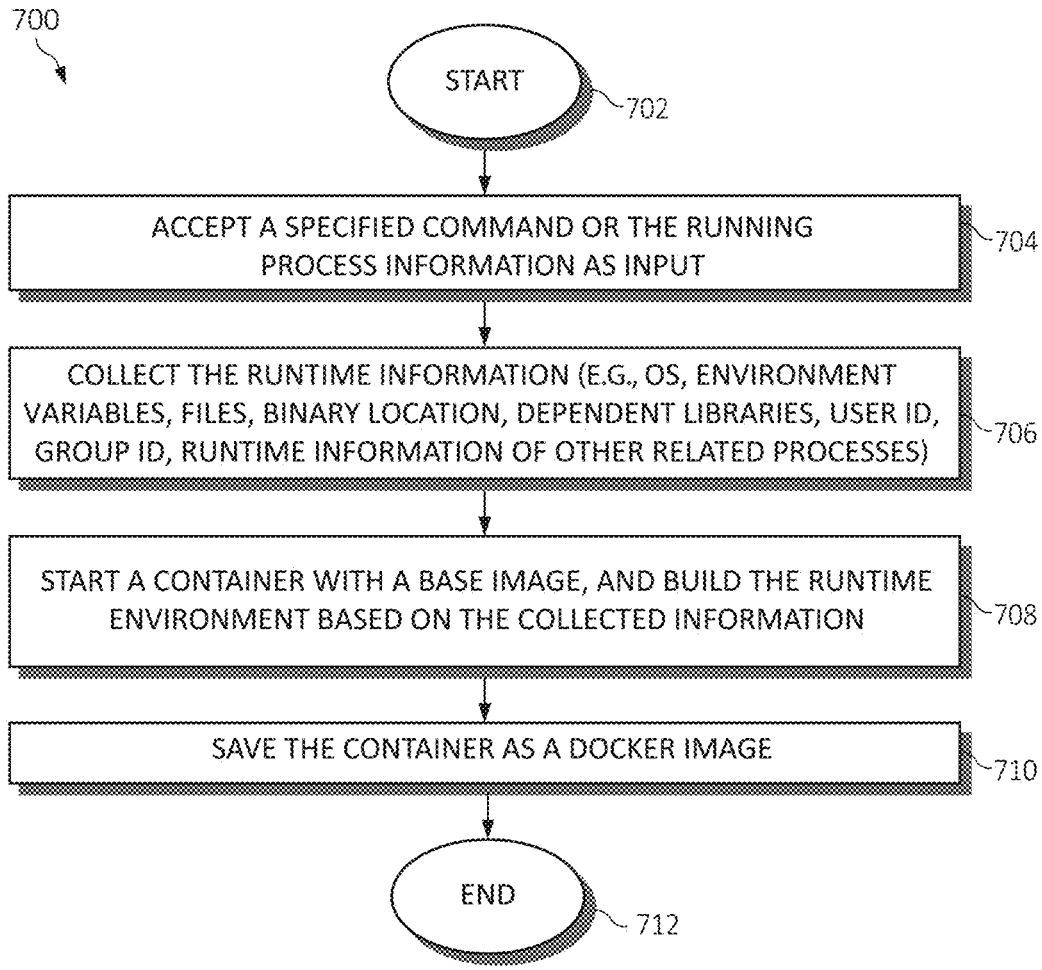
FIG. 7 is a flowchart diagram depicting an exemplary method for automatically generating a container image in one of a plurality of service runtime environment by a processor in which aspects of the present invention may be realized.

Turning now to FIG. 7, a method 700 for automatically generating a container image depicted, in which various aspects of the illustrated embodiments may be implemented. The functionality 700 may be implemented as a method executed as instructions on a machine, where the instructions are included on at least one computer readable medium or on a non-transitory machine-readable storage medium. The functionality 700 may start in block 702.

A specified command or running process information may be accepted as input data, as in block 704. Runtime information may be collected (e.g., the OS, environmental variables, files, binary location, dependent libraries, user ID, group ID, runtime information of other related processes, as in block 706. A new container may be started with an appropriate base image and the runtime environment may be built based on the collected information, as in block 708. The container may be saved as a docker image, as in block 710. The functionality 700 may end in block 712.

Figure 8:
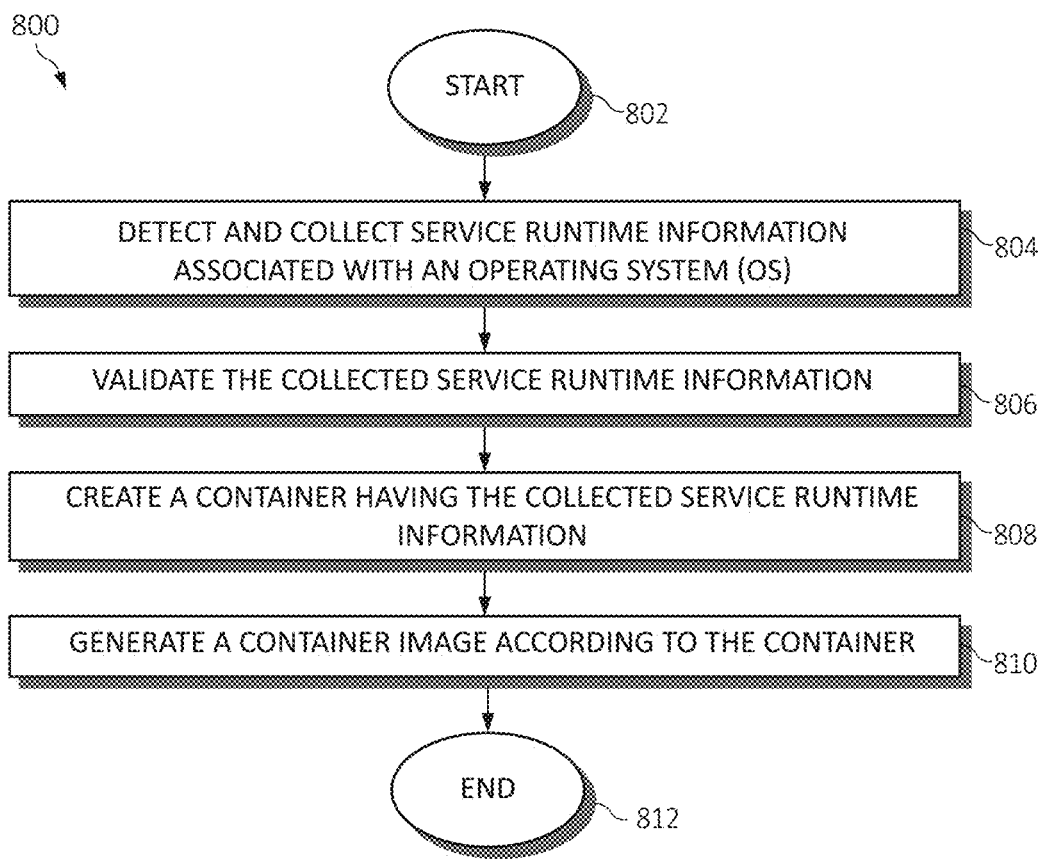
FIG. 8 is a flowchart diagram depicting an exemplary method for automatically generating a container image in one of a plurality of service runtime environment by a processor; again, in which aspects of the present invention may be realized.

Turning now to FIG. 8, a method 800 for automatically generating a container image depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 702.

Service runtime information associated with an operating system (OS) may be detect and collected, as in block 804. The collected service runtime information may be validated, as in block 806. A container having the collected service runtime information may be created, as in block 808. A container image may be created/generated according to the container, as in block 810. The functionality 800 may end in block 812.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for automatically generating a container image for a comprising:
   executing an application on a host:
   during the execution of the application, detecting and collecting service runtime information associated with an operating system (OS) under which the application is executing,
   wherein the service runtime information is detected and collected by a monitoring agent operating as a background task of the OS:
   including activating the container using the container image for one of a plurality of selected runtime environment;
   creating the container having the collected service runtime information;
   generating a container image according to the container: and
   updating the container image upon detecting a change to the service runtime information.

2. The method of claim 1, further including validating the collected service runtime information.

3. The method of claim 1, wherein collecting the service runtime information further includes collecting information of the OS, patches information, one or more variables and parameters, one or more files, a binary location, one or more libraries, a user identifier (ID), a group ID, a startup time, process ID, a command name, or a combination thereof.

4. The method of claim 1, further including:
   identifying one or more processes on the OS and each relationship between the one or more processes; and
   selecting the one or more processes of the OS to monitor and collect the service runtime information.

5. The method of claim 1, further including creating the container with a selected base container image and building a runtime environment based on the collected service runtime information.

6. A system for automatically generating a container image in a computing environment, comprising:
one or more computers with executable instructions that when executed cause the system to: execute an application on a host:
during the execution of the application, detect and collecting service runtime information associated with an operating system (OS) under which the application is executing;
wherein the service runtime information is detected and collected by a monitoring agent operating as a background task of the OS;
wherein the executable instructions activate the container using the container image for one of a plurality of selected runtime environment;
create the container having the collected service runtime information;
generate a container image according to the container; and
update the container image upon detecting a change to the service runtime information.

7. The system of claim 6, wherein the executable instructions validate the collected service runtime information.

8. The system of claim 6, wherein the executable instructions, pursuant to collecting the service runtime information, collect information of the OS, patches information, one or more variables and parameters, one or more files, a binary location, one or more libraries, a user identifier (ID), a group ID, a startup time, process ID, a command name, or a combination thereof.

9. The system of claim 6, wherein the executable instructions:
identify one or more processes on the OS and each relationship between the one or more processes; and
select the one or more processes of the OS to monitor and collect the service runtime information.

10. The system of claim 6, wherein the executable instructions create the container with a selected base container image and building a runtime environment based on the collected service runtime information.

11. A computer program product for automatically generating a container image by a processor, the computer program product comprising a non-transitory computer-readable storage medium having computer-readable program code portions stored therein, the computer-readable program code portions comprising:
an executable portion that executes an application on a host:
an executable portion that during the execution of the application, detects and collecting service runtime information associated with an operating system (OS) under which the application is executing,
wherein the service runtime information is detected and collected by a monitoring agent operating as a background task of the OS;
creates the container with a selected base container image and building a runtime environment based on the collected service runtime information; or
activates the container using the container image for one of a plurality of selected runtime environment;
an executable portion that creates a container having the collected service runtime information;
an executable portion that generates the container image according to the container; and
an executable portion that updates the container image upon detecting a change to the service runtime information.

12. The computer program product of claim 11, further including an executable portion that validate the collected service runtime information.

13. The computer program product of claim 11, further including an executable portion that, pursuant to collecting the service runtime information, collects information of the OS, patches information, one or more variables and parameters, one or more files, a binary location, one or more libraries, a user identifier (ID), a group ID, a startup time, process ID, a command name, or a combination thereof.

14. The computer program product of claim 11, further including an executable portion that:
identifies one or more processes on the OS and each relationship between the one or more processes; and
selects the one or more processes of the OS to monitor and collect the service runtime information.

* * * * *